(12) United States Patent
Chaturvedi et al.

(10) Patent No.: US 6,950,500 B1
(45) Date of Patent: Sep. 27, 2005

(54) INTERNET-BASED AND NETWORK-BASED RELAY CENTER ACCESS FOR THE HEARING AND SPEECH IMPAIRED

(75) Inventors: Pawan Chaturvedi, Overland Park, KS (US); Andrew McCullough, Lenexa, KS (US); Paul W. Ludwick, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1113 days.

(21) Appl. No.: 09/723,780

(22) Filed: Nov. 28, 2000

(51) Int. Cl.[7] .......................................... H04M 11/00
(52) U.S. Cl. ..................................... 379/52; 379/88.12
(58) Field of Search ............................... 379/52, 88.12, 379/90.01, 93.15, 93.17, 93.18, 93.21, 93.24, 379/93.23, 93.35; 370/352

(56) References Cited

U.S. PATENT DOCUMENTS

| 6,421,425 B1 * | 7/2002 | Bossi et al. ................... 379/52 |
| 6,546,082 B1 * | 4/2003 | Alcendor et al. ............. 379/52 |
| 6,717,936 B1 * | 4/2004 | Srinivasan ................... 370/352 |

* cited by examiner

Primary Examiner—Wing Chan

(57) ABSTRACT

A system and a method for providing telephone call message translation via a relay center having a message translator for translating messages between parties of a telephone call from text to speech and from speech to text, as required. A communication link is provided between at least a first party of a number of parties of the telephone call and the message translator via one of an Internet Protocol connection or a network connection.

11 Claims, 2 Drawing Sheets

INTERNET-BASED AND NETWORK-BASED RELAY CENTER ACCESS FOR THE HEARING AND SPEECH IMPAIRED

BACKGROUND OF THE INVENTION

The present invention generally relates to telecommunications services for the hearing and speech impaired. Yet more particularly, the present invention relates to systems and methods for providing relay center services to the hearing and speech impaired via the Internet or other interactive network.

Title IV of the Americans with Disabilities Act of 1990 requires the Federal Communications Commission (FCC) to ensure that telecommunications services are provided to the hearing and speech impaired. In furtherance of this requirement, telecommunications service providers currently provide Telecommunications Relay Services (TRS), or relay centers, as a functional equivalent of telecommunications services for the hearing and speech impaired. Relay centers have been used to provide telecommunications access to hearing- and speech-impaired people on a nationwide basis since 1983.

Relay centers operate in the following manner. A calling party for this system may be a hearing- or speech-impaired person or a non-impaired person wishing to talk to the hearing- or speech-impaired person.

In a case where the calling party is a hearing- or speech-impaired person, the calling party uses a Telecommunication Device for the Deaf (TDD), such as a Teletypewriter (TTY), for transmitting and receiving typed messages during a call. The calling party places a call to a relay center by dialing a local toll free telephone number. The call is received in the relay center and directed via a switching system to a communication assistant terminal in the relay center. The call is a modem connection between the calling party and the communication assistant terminal. The calling party then types a telephone number of a non-impaired person that the calling party desires to call. The communication assistant then places a call to the non-impaired person at the desired telephone number. When the call is established with the non-impaired party, the communication assistant acts to relay the call between the calling party and the called party. The calling party types in messages which are read by the communication assistant, who then speaks the messages to the called party. Accordingly, the called party speaks messages to the communication assistant, who in turn types in the called party's messages to be read by the calling party. This operation is performed in an opposite manner when a non-impaired person calls a hearing- or speech-impaired person.

In a conventional relay center, the switching system is connected to a modem in each of the communication assistant terminals and to a call controller. One type of switching system typically used in a call center is a Rockwell Galaxy ACD switch. The call controller is a system having a processing unit and associated memory.

The call controller determines which communication assistant terminal is available to handle a call. When the switching system receives a request for a communication assistant, the switching system transmits a request to the call controller for an available terminal. The call controller responds to the switching system by transmitting an identity of an available communication assistant terminal. The switching system then extends the call to the identified communication assistant terminal.

Each communication assistant terminal includes a computer system that can convert signals received via modem into a text message that is displayed upon a screen. Each terminal also has a telephone station connected to the switching system to receive and to place voice telephonic calls. The communication assistant can enter text into the computer system via a keyboard. The computer system converts the entered text into text messages transmitted to a calling party over the connection established by the modem. The computer is also connected to a network. When a call is completed to a terminal, a Call Detail Record (CDR) is generated by the computer system. The call detail record includes information pertaining to the length of the call. The CDR is then stored by the computer system.

A billing system is connected to each terminal via a network. Periodically, each computer system transmits stored CDRs to the billing system for processing. The billing system then uses the CDRs to generate billing.

Currently, a hearing- or speech-impaired person is limited to making and receiving calls through a TDD access device, which is fixed to its location. While some public telephones, such as those found in airports, are equipped with TDD capabilities, a hearing- or speech-impaired person is generally limited to calling from a TDD device located in their home. In addition, some telephone services available to non-impaired users, such as digital cellular and mobile phone service, are not currently available to hearing- and speech-impaired users. Thus, hearing- and speech-impaired people are greatly restricted in their mobility and by their dependence on TDD devices.

Further, current relay centers provide only a limited number of features. These features are generally restricted to those identified above. A hearing- or speech-impaired person cannot currently actively participate in a conference call or have a multi-party phone conversation. One reason for these limitations is that TDD uses a half-duplex protocol. Even for a person-to-person conversation, the half-duplex protocol limits the interaction between the callers, as one party cannot interrupt or interject when the other party is speaking/typing.

Accordingly, there is a need to provide a hearing- or speech-impaired person with more flexible access to telecommunications service and, thus, eliminate the hearing impaired person's dependency on a TDD device. There is a further need to provide a hearing- or speech-impaired person with access to conference calls and multi-party calls.

SUMMARY OF THE INVENTION

It is therefore an object of the present invention to provide a system and a method for accessing a relay center that 1) eliminates a user's dependence on a TDD device, 2) provides greater mobility for the user, 3) allows for more relay center features, 4) provides for multi-party conversations, and 5) provides for full-duplex protocol sessions with a communication assistant, where each party of the call can send and receive data simultaneously.

The present disclosure provides one or more embodiments directed to improvements in relay center access for hearing- and speech-impaired persons. These improvements can be provided in a single all-encompassing unit or practiced separately.

To this end, in one embodiment, there is provided a method for providing telephone call message translation via a relay center having a message translator for translating messages between parties of a telephone call from text to speech and from speech to text, as required. A communication link is provided between at least a first party of a number of parties of the telephone call and the message translator via one of an Internet Protocol connection or network connection. Further, a communication link can be provided between at least a second party of the number of parties of the telephone call and the message translator, for example, via a dial-up connection. As a result, the present invention provides a method for providing telephone call message translation that does not require the use of a TDD device. A hearing- or speech-impaired person can take part in a telephone call from any location where Internet access is available through a terminal device. Further, the present method permits message translation for services such as conference calls and multi-party calls.

In another embodiment, for providing the communication link between at least the first party of the telephone call and the message translator, a server having communication capability over at least one of an Internet Protocol and a network connection is provided. An Internet Protocol or network connection capable communication device is provided to the first party of the telephone call. One of an Internet Protocol connection or network connection is established from the first party of the telephone call to the server. A dialing out or a direct connection from the server to the relay center is effected and a plain-text connection is established between the server and the relay center. Through a switching device at the relay center, the plain-text connection is directed to an available message translator to complete the communication link.

In a further embodiment, the communication link between at least the second party of the number of parties of the telephone call and the message translator is provided by identifying to the message translator a telephone number of the second party to be called. The message translator effects a dial out from relay center to the second party at the identified telephone number and establishes a dial-up connection to complete the communication link.

In another embodiment, the communication link between at least the second party of the number of parties of the telephone call and the message translator is provided by dialing out from the second party to the relay center and establishing a dial-up connection between the second party and the relay center. Through a switching device at the relay center, the dial-up connection is directed to an available message translator to complete the communication link.

In another embodiment, the communication link between at least the first party of the telephone call and the message translator is provided by providing a terminal device having communication capability to the first party of the telephone call. The message translator effects a dial out from the relay center to the terminal device of the first party. A plain-text connection is established between the relay center and the terminal device to complete the communication link.

In another embodiment, the communication link between at least the first party of the telephone call and the message translator is provided by providing a server having communication capability over at least one of an Internet Protocol and a network connection. An Internet Protocol or network connection capable communication device is provided to the first party of the telephone call. The message translator effects a dial out from the relay center to the server and establishes a plain-text connection between the relay center and the server. One of an Internet Protocol connection or network connection is established from the server to the first party of the telephone call to complete the communication link.

In yet another embodiment, there is provided a system for providing telephone call message translation. The system comprises a relay center having a message translator for translating messages between a number of parties of a telephone call from text to speech and from speech to text, as required. At least one terminal device having at least one of Internet Protocol and network connection capability for use by at least a first party of the telephone call is also provided. The system further comprises a server having a front end interface for establishing one of an Internet Protocol or network connection to the communication device and a back end interface for establishing a plain-text connection to the relay center. As a result, the present invention provides a system for providing telephone call message translation that does not require the use of a TDD device. A hearing- or speech-impaired person can take part in a telephone call from any location where Internet access is available through a terminal device.

The relay center can further comprise at least one dial-up telephone interface for effecting a dial-up connection between the message translator of the relay center and at least a second party of the telephone call. Also, The relay center can comprise a switching device for directing a plain-text connection from the server to an available message translator.

These and other features of the present invention will become clearer with reference to the following detailed description of the presently preferred embodiments and accompanying drawings.

DESCRIPTION OF THE DRAWINGS

The present invention can be better understood with reference to the following figures. The components in the figures are not necessarily to scale, emphasis instead being placed upon illustrating the principals of the invention. Moreover, in the figures, like reference numerals designate corresponding parts throughout the different views.

DETAILED DESCRIPTION OF THE PRESENTLY PREFERRED EMBODIMENTS

As discussed above, there is provided a system and a method for providing call center services to the hearing and speech impaired via the Internet or other interactive network.

Figure 1:
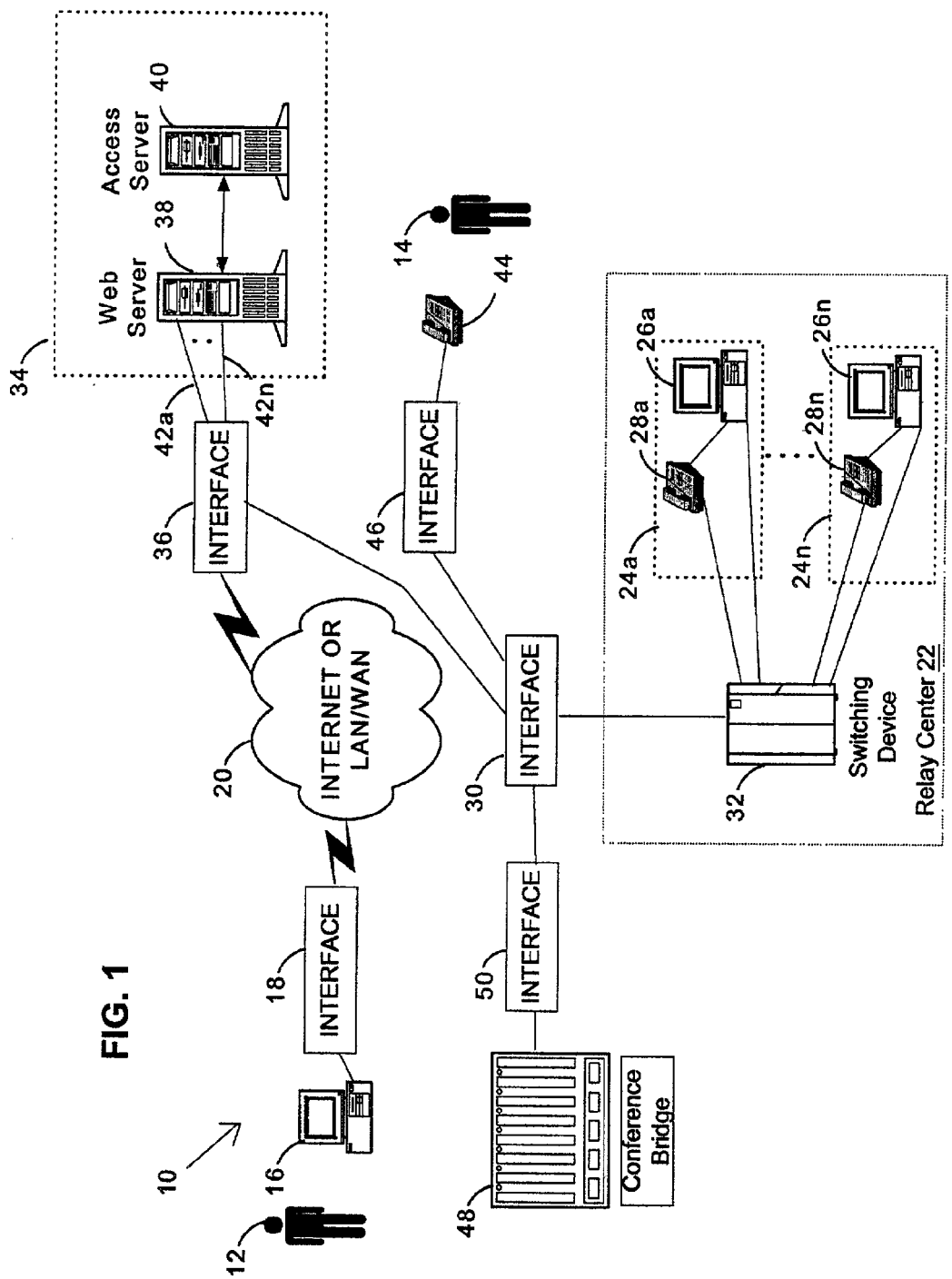
FIG. 1 is a block diagram of a system for providing message translation during a telephone call that operates in accordance with the present invention.

In FIG. 1, there is illustrated a system 10 for providing message translation during a telephone call between a hearing- or speech-impaired person 12 and a non-impaired person 14 that embodies the principles of the present invention. As illustrated, the hearing- or speech-impaired person 12 has a terminal device 16 which is connectable via a communication line interface 18 to the Internet 20. The terminal device 16 is preferably a personal computer having a keyboard for text message entry, a display for displaying messages, and software for Internet access and message transfer. However, the terminal device 16 can be any device that permits communication over Internet Protocol and/or a network connection. The terminal device 16, can be, for example, a cellular telephone, a mobile telephone, or a personal data assistant. The communication line interface 18 can be of any type that permits Internet access, such as, a dial-up connection (POTS) or a digital network connection (such as a LAN/WAN connection).

In order to meet the telecommunications requirements of the hearing- or speech-impaired person 12, a relay center 22 is provided by a telecommunications service provider. The relay center 22 has one or more message translators 24a ... 24n for translating messages between parties of a telephone call from text to speech and from speech to text, as required. The message translator 24 can be either a human communication assistant or an automated communication assistant. In the case of the message translator 24 being a human communication assistant, the message translator 24 has a message translator terminal 26 for sending/receiving text messages to/from the hearing- or speech-impaired person 12. The message translator 24 also has a message translator telephone 28 for verbally communicating with the non-impaired person 14.

In the case of the message translator 24 being an automated communication assistant, the message translator 24 can merely comprise one or more electronic devices (not shown) having message translation capability and communication capability.

Telephone calls enter and leave the relay center 22 via a communication line interface 30 connected to a switching device 32 in the relay center 22. The switching device 32 is in turn connected to each of the message translators 24a ... 24n, including direct connections to each of the message translator terminals 26a ... 26n and each of the message translator telephones 28a ... 28n. As will be discussed in greater detail below, the switching device 32 routes incoming calls to available message translator 24a ... 24n and routes outgoing calls from the message translators 24a ... 24n to the communication line interface 30. The communication line interface 30 can be of any type that permits connection to digital (T1, T3, etc.) and/or analog (dial-up, etc.) communication circuits. The switching device 32 can be, for example, an Automated Call Distributor (ACD), such as a Rockwell Galaxy ACD, which has known features for billing and performance related tasks that are legally mandated. Alternatively, the switching device 32 can be any other type of switching device. The switching device 32 can employ circuits that accommodate any type of a voice switched network, such as, for Feature Group D, ISDN, or Feature Group A (both inband and out of band signaling.

Since current ACDs do not support Internet Protocol connectivity, the connection between the switching device 32 and the communication line interface 30 can be through existing switched voice facilities via an ASCII text modem (not shown). A server 34 is provided to perform as a bridge between the switching device 32 of the relay center 22 and the Internet 20. The communication line interface 30 of the relay center 22 is connected to a communication line interface 36 of the server 34. The server 34 is also connected to the Internet 20 through this communication line interface 36. The server 34 communication line interface 36 can be of any type that permits connection to digital (T1, DS-3, ISDN, etc.) and/or analog (dial-up, etc.) communication circuits. The server 34 can employ circuits that accommodate any type of a voice switched network, such as, for Feature Group D, ISDN, or Feature Group A (both in-band and out-of-band signaling).

The server 34 comprises a front end 38 for administering telephone calls to/from the Internet 20 through the communication line interface 36 and a back end 40 for administering telephone calls to/from the relay center 22 through the communication line interface 36 and the communication line interface 30. Multiple communication connections 42a ... 42n can be supported by a single front end 38. The server 34 accordingly provides a bridge between the relay center 22 and the Internet 20. The server 34 can be located either within or outside of the relay center 22. A telecommunications service provider can furnish either a single server 34 for serving callers from all states or multiple servers 34, for example one in each state.

The front end 38 of the server 34 can be, for example, a web server which administers a web site. The web site has a display interface for providing an interactive session between the hearing- or speech-impaired person 12 and the message translator 24. Through display interface prompts, the hearing- or speech-impaired person 12 can, for example, initiate a telephone call to the relay center, observe a visual indication that there is an incoming call, enter a destination telephone number of the non-impaired person 14 to be called, enter text messages during the telephone call, and view translated text messages from the relay center.

The back end 40 of the server 34 can be, for example, an access server for calling the relay center 22 and setting up analog connections on request. This connection will be a full duplex ASCII connection, allowing the hearing- or speech-impaired person 12 to have an interactive session with the message translator 24. In order to accommodate multiple telephone calls, modem banks (not shown) can be set up between the back end 40 of the server 23 and the communication line interface 36.

The front end web server 38 and the back end access server 40 can either be physically separate devices or combined into a single unit. In a case where both the front end web server 38 and the back end access server 40 are implemented as a single unit, the back end access server 40 can be, for example, one or more ISDN Primary Rate Interface (PRI) cards plugged into the front end web server 38.

The server 34 can be located either at the relay center 22 or at a different location. Further, the back end 40 of the server 34 can be connected directly to the switching device 32 of the relay center 22 through either an analog or a digital (T1, DS-3, ISDN, etc.) connection.

The non-impaired person 14 has a telephonic device 44 which is connectable to a communication line interface 46. The telephonic device 44 can be any device that permits communication through a communication line interface 46, such as for a dial-up connection. The telephonic device 44 can be, for example, a standard telephone, a cellular telephone, or a mobile telephone.

Currently, a hearing- or speech-impaired person must communicate with a relay center through a TDD device over a POTS connection. Since TDD devices can only be used at a fixed location and are limited in number, the hearing- or speech-impaired person is greatly restricted in their mobility and by their dependence on TDD devices. The present system 10 inventively overcomes this known disadvantage by providing a hearing- or speech-impaired person 12 with Internet-based access to a relay center 22 through a terminal device 16 that has Internet connection capability. Thus, the present system 10 allows a hearing- or speech-impaired person 12 to communicate with a relay center 22 from any location where Internet access is available and, further, eliminates the need to use a TDD device.

When a hearing- or speech-impaired person 12 desires to place a telephone call to a non-impaired person 14, first the hearing- or speech-impaired person 12 uses the terminal device 16 to establish a connection over the Internet 20 to the web site on the server 34. In order to establish this connection, the hearing- or speech-impaired person 12 will effect a connection to the Internet 20 by dialing out from the terminal device 16 over the communication line interface 18 to their Internet service provider. Then, the hearing- or speech-impaired person 12 will access the web site on the server 34 by entering an appropriate URL. The server 34 is continuously connected to the Internet 20 through its communication line interface 36 and available for accessing. The front end 38 of the server 34 administers such connections.

Once the hearing- or speech-impaired person 12 has established a connection to the web site on the server 34, the hearing- or speech-impaired person 12 uses the display interface of the web site to establish an interactive session with a message translator 24 in the relay center 22. To do this, the hearing- or speech-impaired person 12 indicates through the display interface that they desire to initiate a telephone call to the relay center 22. The back end 40 of the server device 34 accordingly places a telephone call to the relay center 22 through the communication line interface 36. The telephone call is picked up by the switching device 32 in the relay center 22 through the communication line interface 30. This connection between the server 34 and the relay center 22 can be either an analog or a digital connection.

The switching device 32 then routes the connection to an available message translator 24. If the message translator 24 is a human communication assistant, they will observe that the connection has been made on their message translator terminal 26. At this point, a communication link is established between the hearing- or speech-impaired person 12 and the message translator 24, thus enabling the interactive session during which text messages are communicated.

The hearing- or speech-impaired person 12 then identifies to the message translator 24 a telephone number of the non-impaired person 14 that they desire to call. The message translator 24 accordingly places a telephone call to that person 14 through the message translator telephone 28. The telephone call routes from the message translator telephone 28, through the switching device 32, and through the communication line interface 30 and is picked up at the telephonic device 44 through the communication line interface 46. At this point, a communication link is established between the non-impaired person 14 and the message translator 24, through which communication link voice messages are communicated.

Telephone call message translation can then take place through the message translator 24 at the relay center 22. Text messages from the hearing- or speech-impaired person 12 that are directed to the non-impaired person 14 are displayed on the message translator terminal 26. The message translator 24 reads the text messages aloud into message translator telephone 28 for the non-impaired person 14. Also, voice messages from the non-impaired person 14 that are directed to the hearing- or speech-impaired person 12 are heard by the message translator 24 through the message translator telephone 28. The message translator 24 types the voice message into a text message form on the message translator terminal 26, which message is communicated to the hearing- or speech-impaired person's 12 terminal device 16.

When a non-impaired person 14 desires to place a telephone call to a speech- or hearing-impaired person 12, first the non-impaired person 14 uses the telephonic device 44 to establish a communication link with a message translator 24. The telephonic device 44 is used to place a telephone call to the relay center 22 through the communication line interfaces 46. The telephone call is picked up by the switching device 32 in the relay center 22 through the communication line interface 30. This connection between the telephonic device 44 and the relay center 22 can be either an analog or a digital connection.

The switching device 32 then routes the connection to an available message translator 34. If the message translator 34 is a human communication assistant, they will observe that the connection has been made on their message translator terminal 26. At this point, a communication link is established between the non-impaired person 14 and the message translator 24, through which communication link voice messages are communicated.

The non-impaired person 14 then identifies to the message translator 24 a telephone number of the hearing- or speech-impaired person 12 that they desire to call. There are several options available for establishing a communication link between the message translator 24 and the hearing- or speech-impaired person 12.

Figure 2:
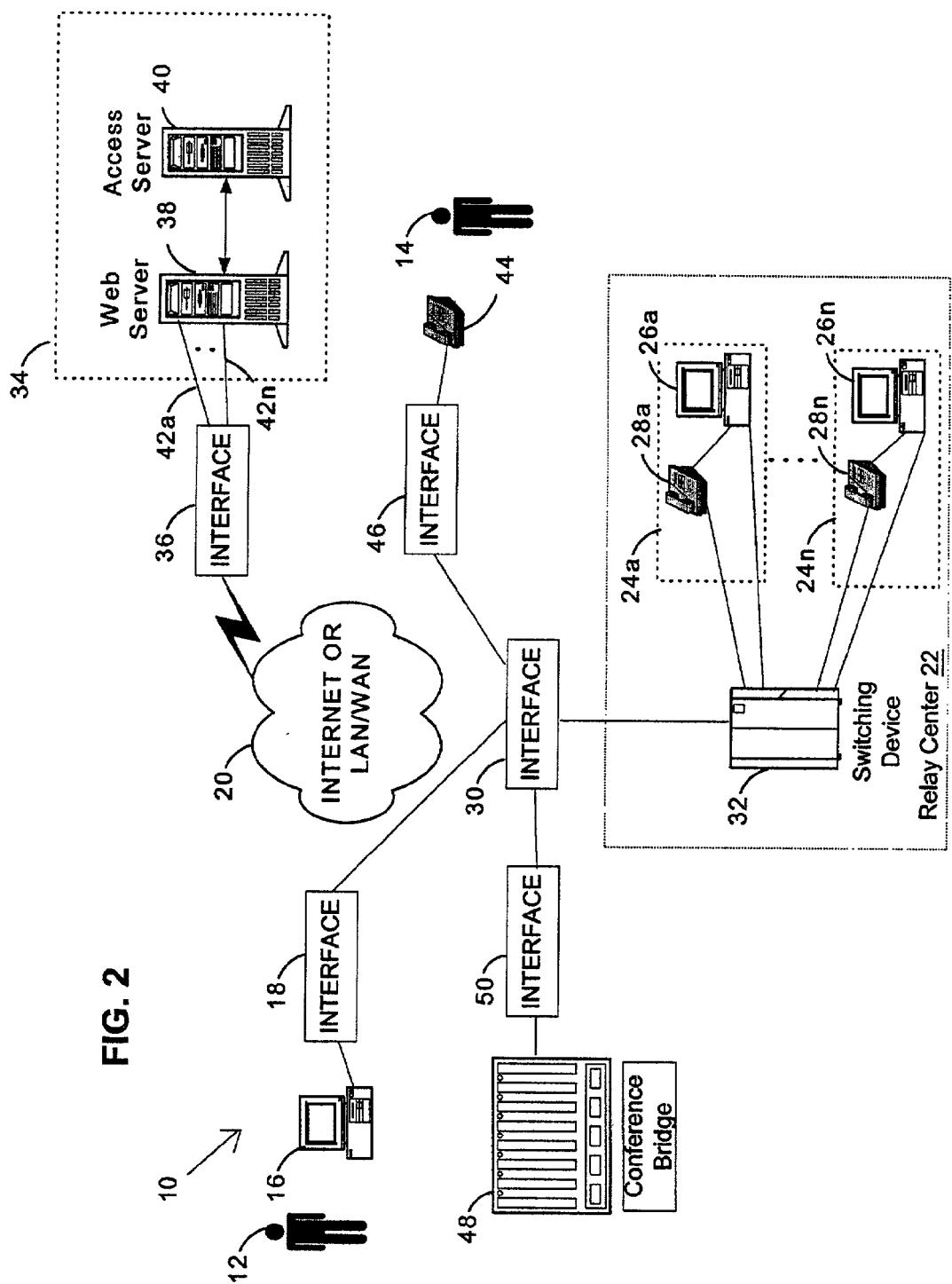
FIG. 2 is a block diagram of a further system for providing message translation during a telephone call that operates in accordance with the present invention.

Referring to FIG. 2, according to a first option, the message translator 24 directly calls the hearing- or speech-impaired person's 12 terminal device 16, which is connected to the communication line interface 18 but not to the Internet 20. This option requires that the terminal device 16 has a remote dialing/text message interaction software, such that the hearing- or speech-impaired person 12 is provided visual notification of an incoming call. The software enables the terminal device 16 to accept the incoming call and permits the hearing- or speech-impaired person 12 to have an interactive session with the message translator 24.

Referring to FIG. 1, according to a second option, the message translator 24 exchanges real-time text messages with the hearing- or speech-impaired person's 12 terminal device 16, which is connected to the Internet 20. An email or some other network address may be substituted for the hearing- or speech-impaired person's telephone number.

According to a third option, the message translator 24 establishes a connection to the hearing- or speech-impaired person's 12 terminal device 16 via the Internet 20. This option requires that the terminal device 16 already has an Internet 20 connection established in order to receive the incoming call from the message translator 24.

After the communication link is established between the message translator 24 and the hearing- or speech-impaired person 12, telephone call message translation can then take place through the message translator 24 at the relay center 22.

Thus, the present invention eliminates the geographical constraints associated with current message translation methods and TDD devices by providing a system and method for providing telephone call message translation via a relay center 22 wherein a hearing- or speech-impaired person 12 can conduct a telephone call from any location where Internet 20 access is available through a terminal device 16.

Further, current relay centers provide a limited number of features, such as message translation for only two party telephone calls. A hearing- or speech-impaired person cannot currently actively participate in a conference call or have a multi-party telephone conversation. One reason for these limitations is that TDD devices use a half-duplex protocol. Even for a person-to-person conversation, the half duplex protocol limits the interaction between the callers, as one party cannot interrupt or interject when the other party is speaking (i.e. via text or voice as relayed by a communication assistant).

The present invention overcomes these limitations by providing a full-duplex protocol connection between the server 34 and the relay center 22, as discussed above.

Further, terminal device 16 supports the full-duplex protocol as well as Internet protocol and/or network connections. Thus, the present invention permits a hearing- or speech-impaired person 12 to take part in a conference call or multi-party telephone conversation.

During a conference call or multi-party call, the message translator 24 calls a conference bridge 48 via a communication line interface 50 on behalf of the hearing- or speech-impaired person 12. A single message translator 24 can provide simultaneous message translation for multiple hearing- or speech-impaired people 24. Parties are identified on the terminal device 16 and on the message translator terminal 26 by using a protocol, such as a party's name.

The foregoing provides a system and a method for accessing a relay center that 1) eliminates a user's dependence on a TDD device, 2) provides greater mobility for the user, 3) allows for more relay center features, 4) provides for multi-party conversations, and 5) provides for full-duplex protocol sessions with a communication assistant, where each party of the call can send and receive data simultaneously.

As is apparent from the foregoing specification, the present invention is susceptible to being embodied with various alterations and modifications which may differ particularly from those that have been described in the preceding specification and description. It should be understood that it is desired to embody within the scope of the patent warranted herein all such modifications as reasonably and properly come within the scope of the presently defined contribution to the art.

What is claimed is:

1. A method for providing telephone call message translation via a relay center having a message translator for translating messages between parties of a telephone call from text to speech and from speech to text, the method comprising the steps of:
    providing a full-duplex text communication link between at least a first party of a number of parties of the telephone call and the message translator via an Internet Protocol connection;
    providing a voice communication link between at least a second party of the number of parties of the telephone call and the message translator; and
    providing a communication link between a conference bridge and the message translator, thereby allowing the first party to participate in a conference call with at least the second party via the full-duplex text communication link.

2. The method for providing telephone call message translation via a relay center as claimed in claim 1, wherein the full-duplex text communication link between at least the first party of the telephone call and the message translator is provided by:
    providing a terminal device having communication capability to the first party of the telephone call;
    the message translator effecting a dial out from the relay center to the terminal device of the first party; and
    establishing a full-duplex text connection between the relay center and the terminal device to complete the full-duplex text communication link.

3. The method for providing telephone call message translation via a relay center as claimed in claim 1, wherein the full-duplex text communication link between at least the first party of the telephone call and the message translator is provided by:
    providing a server having communication capability over an Internet Protocol connection;
    providing an Internet Protocol connection capable communication device to the first party of the telephone call;
    establishing a full-duplex text Internet Protocol connection from the first party of the telephone call to the server;
    establishing a full-duplex text connection between the server and the relay center; and
    through a switching device at the relay center, directing the full-duplex text connection to an available message translator to complete the full-duplex text communication link.

4. The method for providing telephone call message translation via a relay center as claimed in claim 1, wherein the voice communication link between at least the second party of the number of parties of the telephone call and the message translator is provided by:
    identifying to the message translator a telephone number of the second party to be called;
    the message translator effecting a dial out from the relay center to the second party at the identified telephone number and establishing a dial-up connection to complete the voice communication link.

5. The method for providing telephone call message translation via a relay center as claimed in claim 1, wherein the voice communication link between at least the second party of the number of parties of the telephone call and the message translator is provided by:
    dialing out from the second party to the relay center and establishing a dial-up connection between the second party and the relay center, and
    through a switching device at the relay center, directing the dial-up connection to an available message translator to complete the voice communication link.

6. The method for providing telephone call message translation via a relay center as claimed in claim 1, wherein the full-duplex text communication link between at least the first party of the telephone call and the message translator is provided by:
    providing a server having communication capability over an Internet Protocol connection;
    providing an Internet Protocol connection capable communication device to the first party of the telephone call;
    the message translator establishing a full-duplex text connection between the relay center and the server, and
    establishing a full-duplex text Internet Protocol connection from the server to the first party of the telephone call to complete the full-duplex text communication link.

7. The method for providing telephone call message translation via a relay center as claimed in claim 6, wherein the full-duplex text communication link between at least the first party of the telephone call and the message translator comprises a real-time exchange of messages.

8. A system for providing telephone call message translation, the system comprising:
    a relay center having a message translator for translating messages between a number of parties of a telephone call from text to speech and from speech to text;
    at least one terminal device having Internet Protocol connection capability for use by at least a first party of the telephone call;

a server having a front end interface for establishing an Internet Protocol full-duplex text connection to the terminal device and a back end interface for establishing a full-duplex text connection to the relay center; and a conference bridge coupled with the relay center to allow the first party to participate in a conference call via the full-duplex text connections.

9. The system as claimed in claim 8, wherein the front end of the server comprises a web server; and wherein the back end of the server comprises an access server.

10. The system as claimed in claim 8, wherein the relay center further comprises at least one dial-up telephone interface for effecting a dial-up connection between the message translator of the relay center and at least a second party of the telephone call.

11. The system as claimed in claim 8, wherein the relay center further comprises a switching device for directing a full-duplex text connection from the server to an available message translator.

* * * * *